United States Patent
Flockhart et al.

[11] Patent Number: 6,088,441
[45] Date of Patent: Jul. 11, 2000

[54] ARRANGEMENT FOR EQUALIZING LEVELS OF SERVICE AMONG SKILLS

[75] Inventors: Andrew D. Flockhart, Thornton, Colo.; Robin H. Foster, Little Silver, N.J.; Roy A. Jensen, Westminster; Joylee E. Kohler, Northglenn, both of Colo.; Eugene P. Mathews, Barrington, Ill.

[73] Assignee: Lucent Technologies Inc., Murray Hill, N.J.

[21] Appl. No.: 08/992,307

[22] Filed: Dec. 17, 1997

[51] Int. Cl.[7] .................................................. H04M 3/00
[52] U.S. Cl. .......................... 379/265; 379/266; 379/269; 379/309
[58] Field of Search .................................. 379/264, 265, 379/266, 309, 201, 210, 211, 212

[56] References Cited

U.S. PATENT DOCUMENTS

| | | | |
|---|---|---|---|
| 5,206,903 | 4/1993 | Kohler et al. | 379/309 |
| 5,309,513 | 5/1994 | Rose | 379/265 |
| 5,335,269 | 8/1994 | Steinlicht | 379/266 |
| 5,467,391 | 11/1995 | Donaghue, Jr. et al. | 379/265 |
| 5,784,452 | 7/1998 | Carney | 379/265 |
| 5,825,869 | 10/1998 | Brooks et al. | 379/265 |
| 5,903,641 | 5/1999 | Torisson | 379/266 |

OTHER PUBLICATIONS

U.S. Patent Application, J.E. Kohler 5, Serial No. 08/674,477, "Agent Vectoring", Filed Jul. 2, 1996.

U.S. Patent Application, A.V. Tonisson 1, Serial No. 08/790,010, "Automatic Dynamic Changing of Agents' Call-Handling Assignments", Filed Jan. 28, 1997.

DEFINITY® Communications System Generic 3 Call Vectoring/Expert Agent Selection (EAS) Guide, 555–230–520, Issue 3, Nov. 1993, 43 pages.

Foster: "Advanced DEFINITY Call Centers: Working for You and Your Customers" vol. 9, No. 2, 1994, pp. 6–11, XP000458375, New York, USA.

Primary Examiner—Krista Zele
Assistant Examiner—Bing Bui
Attorney, Agent, or Firm—David Volejnicek

[57] ABSTRACT

In a skills-based ACD, an available agent is reserved and assigned to handle calls needing a "rare" skill of the agent and is prevented from handling calls needing a "common" skill of the agent even if calls needing the common skill are waiting to be handled, if not reserving the agent for the calls needing the rare skill would deprive those calls of the last available agent, even if no calls needing the rare skill are available for handling. The agent is reserved only if target performance criteria, such as average speed of answer, for handling the calls needing the common skill are being met. In case of more than one agent being available to handle calls that need the rare skills, one of these agents is selected and reserved and the other agents are freed to serve calls needing "common" skills.

10 Claims, 3 Drawing Sheets

ARRANGEMENT FOR EQUALIZING LEVELS OF SERVICE AMONG SKILLS

TECHNICAL FIELD

This invention relates to automatic call distribution (ACD) systems, also variously referred to as call centers or telemarketing systems.

BACKGROUND OF THE INVENTION

ACD systems distribute calls—whether inbound or outbound—for handling to any suitable ones of available call-handling agents according to some predefined criteria. In many existing systems, such as the Lucent Technologies Definity® ACD system, the criteria for handling the call from the moment that the ACD system becomes aware of the call until the call is connected to an agent are customer-specifiable (i.e., programmable by the operator of the ACD system) via a capability called call vectoring. Normally in present-day ACD systems, when the ACD system's controller detects that an agent has become available to handle a call, the controller identifies all predefined call-handling skills of the agent (usually in some order of priority) and delivers to the agent the highest-priority oldest-waiting call that matches the agent's highest-priority skill. Generally the only condition that results in a call not being delivered to an available agent is that there are no calls waiting to be handled.

In many call centers, agents are members of multiple skills (i.e., multiple agent splits corresponding to different agent skills). Some of these skills (e.g., general sales or inquiry skills) have many agent members while others (e.g., specialized sales or inquiry skills, non-native language skills, etc.) have only a few agent members. In these situations, even if the rare skill is appropriately staffed, when a rare call arrives, it is likely that all of the rare-skill agents are busy handling common-skill calls, with the result that, on average, the rare-skill call has to wait a significant amount. of time for a rare-skill agent to become available. Furthermore, the same level of service is desired across all skills. This is typically expressed as average speed of answer (ASA) or a percentage of calls answered within a specified time interval; 80 percent in 20 seconds is an industry standard.

In such call centers, however, callers to the larger, general, skills experience a higher quality or level of service than callers to the smaller, rare, skills. All other things being equal, this is due to the number of agents in the skills: the more agents there are in a skill, the higher is the level of service provided. This is due to the fact that when an incoming call arrives in a skill with no currently-available agents, the more working agents there are in the skill, the shorter is the time that the call has to wait before an agent becomes available to handle a call in that skill. In the extreme case of very rare skills, where the number of agents possessing that skill is very low, call wait-times can be so long that callers abandon the calls before the calls are answered.

A way to equalize the level of service provided to smaller skills is to overstaff these skills, either by adding agents that have only the specialized skills or by moving the agents from the larger skills. Either solution is costly and inefficient; additional training resources are also required.

SUMMARY OF THE INVENTION

This invention is directed to solving these and other problems and disadvantages of the prior art. According to the invention, a call handler (e.g., a call center agent) having a plurality of skills who has become available to handle a call is assigned to handle calls needing one or another of the call handler's skills such that no skill of the agent which is considered to be a "rare" skill is deprived of the last agent available to handle calls needing that skill. The term "call" is used broadly herein to mean any type of communication. Specifically, in response to a call handler having both a "rare" skill and a "common" skill becoming available to handle a call, it is determined whether assigning the call handler to handle a call needing the common skill would deprive calls needing the rare skill of an only available call handler having the rare skill. If so, the call handler is assigned to handle a call needing the rare skill even when no call needing the rare skill is available for handling by the call handler, and the call handler is not assigned to handle calls needing the common skill even when a call needing the common skill is available for handling by the call handler. The call handler is thus reserved for calls needing the call handler's non-common skills (e.g., the "rare" skills and optionally any "normal" skills) and the call handler is made unavailable to handle any calls requiring the call handler's common skills even though such calls are waiting to be handled.

Preferably, before the call handler is assigned, a determination is made of whether a service objective is being met for the calls needing the common skill, and the call handler is not assigned to handling calls that need the common skill only if the service objective is being met. Furthermore preferably, if it is determined that the abovementioned assignment would not deprive the calls needing the rare skill of the last available call handler that can handle those calls, one of those available call handlers is selected, the selected call handler is not assigned to handle calls needing a common skill of the selected call handler, and the non-selected call handler is assigned to handle calls needing the common skill of the non-selected call handler. In this manner, the number of reserved call handlers is minimized and only the best (i.e., selected) call handlers are reserved.

These and other features and advantages of the present invention will become more apparent from the following description of an illustrative embodiment of the invention considered together with the drawing.

DETAILED DESCRIPTION

Figure 1:
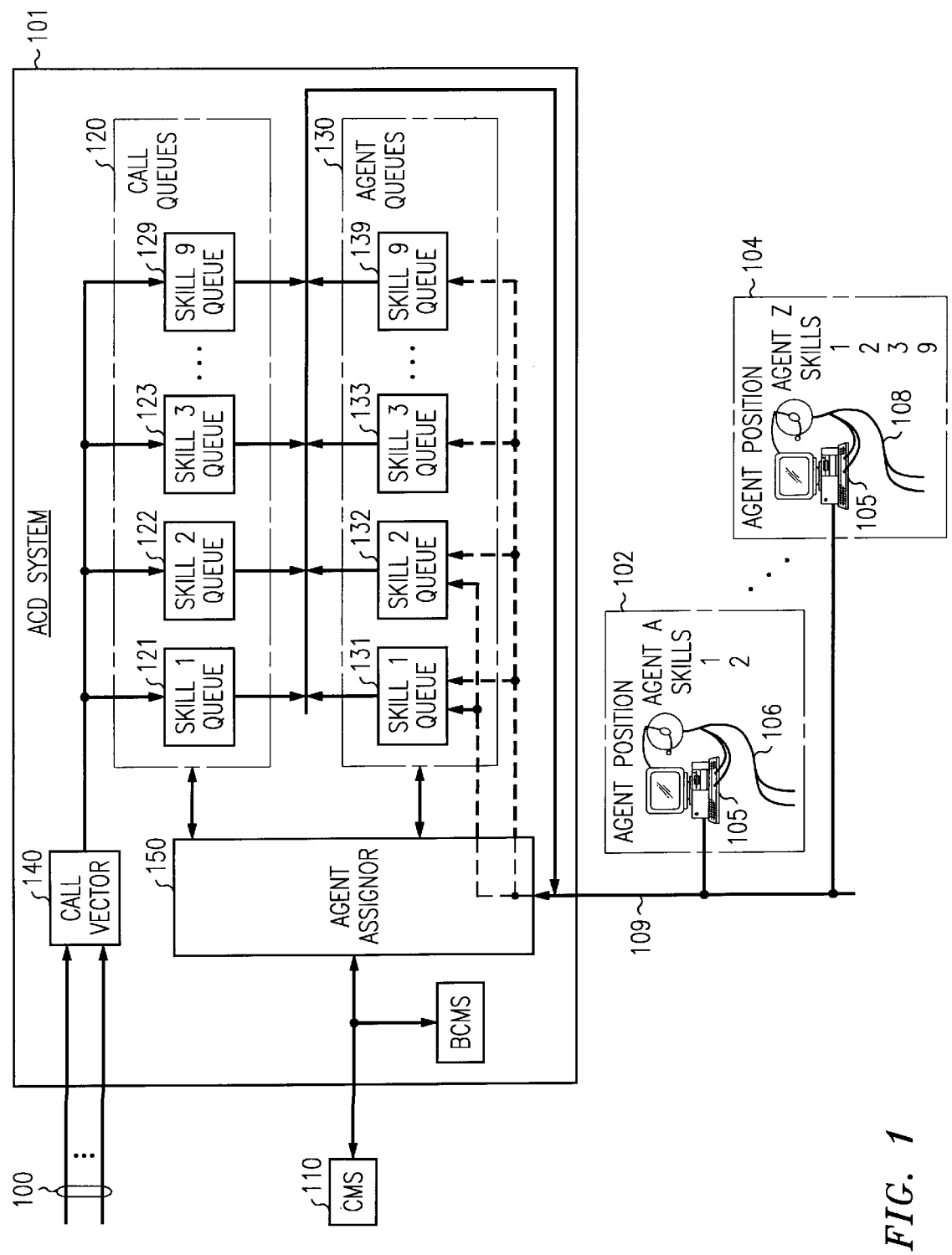
FIG. 1 is a block diagram of a call center that includes an illustrative embodiment of the invention.

FIG. 1 shows an illustrative call center. As is conventional, the call center comprises a plurality of telephone lines and/or trunks 100 selectively interconnected with a plurality of agent positions 102–104 via an ACD system 101. Each agent position 102–104 includes a voice-and-data terminal 105 for use by a corresponding agent 106–108 in handling calls. Terminals 105 are connected to ACD system 101 by a voice-and-data transmission medium 109. Also, included in ACD system 101 is a conventional basic call management system (BCMS) and connected to ACD system 101 is a conventional call management system (CMS) 110 that gather call records and call-center statistics for use in managing the call center and in generating call-center reports. CMS and BCMS will hereafter be referred to jointly as CMS 110.

ACD system 101 is illustratively the Lucent Technologies Definity® private-branch exchange (PBX)-based ACD system. It is a stored-program-controlled system that conventionally includes interfaces to external communications links, a communications switching fabric, service circuits (e.g., tone generators, announcement circuits, etc.), memory for storing control programs and data, and a processor (i.e., a computer) for executing the stored control programs to control the interfaces and the fabric and to provide automatic call-distribution functionality. Included among the data stored in ACD system 101 are a set of call queues 120 and a set of agent queues 130. Each call queue 121–129 corresponds to a different agent skill, as does each agent queue 131–139. Conventionally, calls are prioritized, and either are enqueued in individual ones of call queues 120 in their order of priority or are enqueued in different ones of a plurality of call queues that correspond to a skill and each one of which corresponds to a different priority. Likewise, each agent's skills are prioritized according to his or her level of expertise in that skill, and either agents are enqueued in individual ones of agent queues 130 in their order of expertise level or are enqueued in different ones of a plurality of agent queues that correspond to a skill and each one of which corresponds to a different expertise level. Included among the control programs in ACD system 101 is a call vector 140. Calls incoming to the call center on lines or trunks 100 are assigned by call vector 140 to different call queues 121–129 based upon the agent skill that they require for their proper handling. Agents 106–108 who are available for handling calls are assigned to agent queues 131–139 based upon the skills which they possess. An agent may have multiple skills, and hence may be assigned to multiple agent queues 131–139 simultaneously. Furthermore, an agent may have different levels of skill expertise (e.g., skill levels 1–16 in one known system or merely primary (P) skills and secondary (S) skills in another known system), and hence may be assigned to different agent queues 131–139 at different expertise levels. Call vectoring is described in DEFINITY® Communications System Generic 3 Call Vectoring/Expert Agent Selection (EAS) Guide, AT&T publication no. 555-230-520 (Issue 3, November 1993). Skills-based ACD is described in further detail in U. S. Pat. No. 5,206,903.

According to the invention, included among the programs executing on ACD system 101 is an agent assignor 150. Agent assignor 150 is stored either in the main memory or in a peripheral memory (e.g., disk, CD ROM, etc.) or some other computer-readable medium of ACD system 101. Agent assignor 150 effects an assignment between available agents and agent skill queues 131–139 in a way that tends to equalize the level of service provided to rare (less-often needed and therefore staffed by fewer agents) skills with that provided to common skills.

Figure 2:
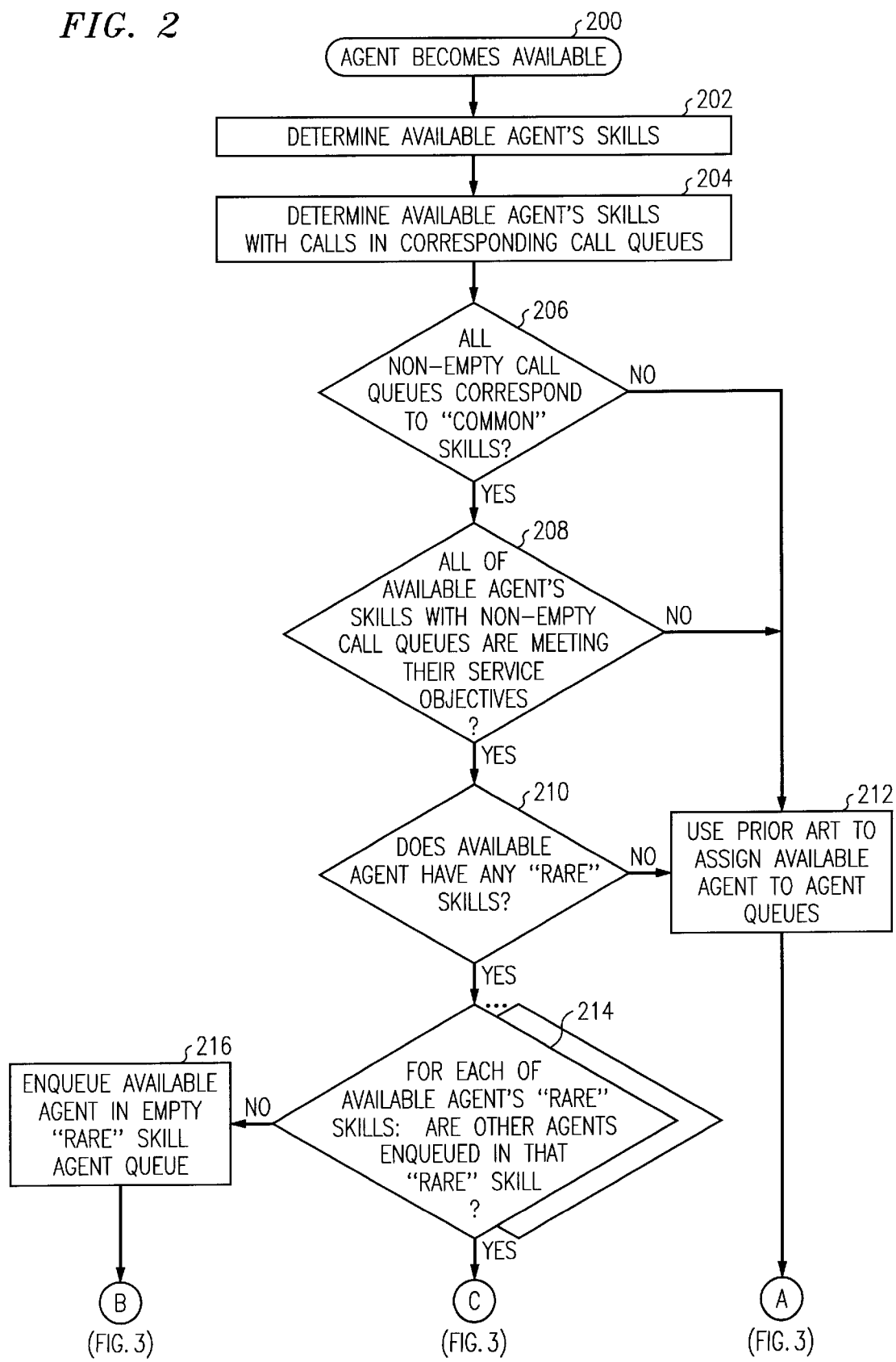
FIGS. 2 and 3 are a functional flow diagram of an illustrative embodiment of an agent assignor of the call center of FIG. 1.
Figure 3:
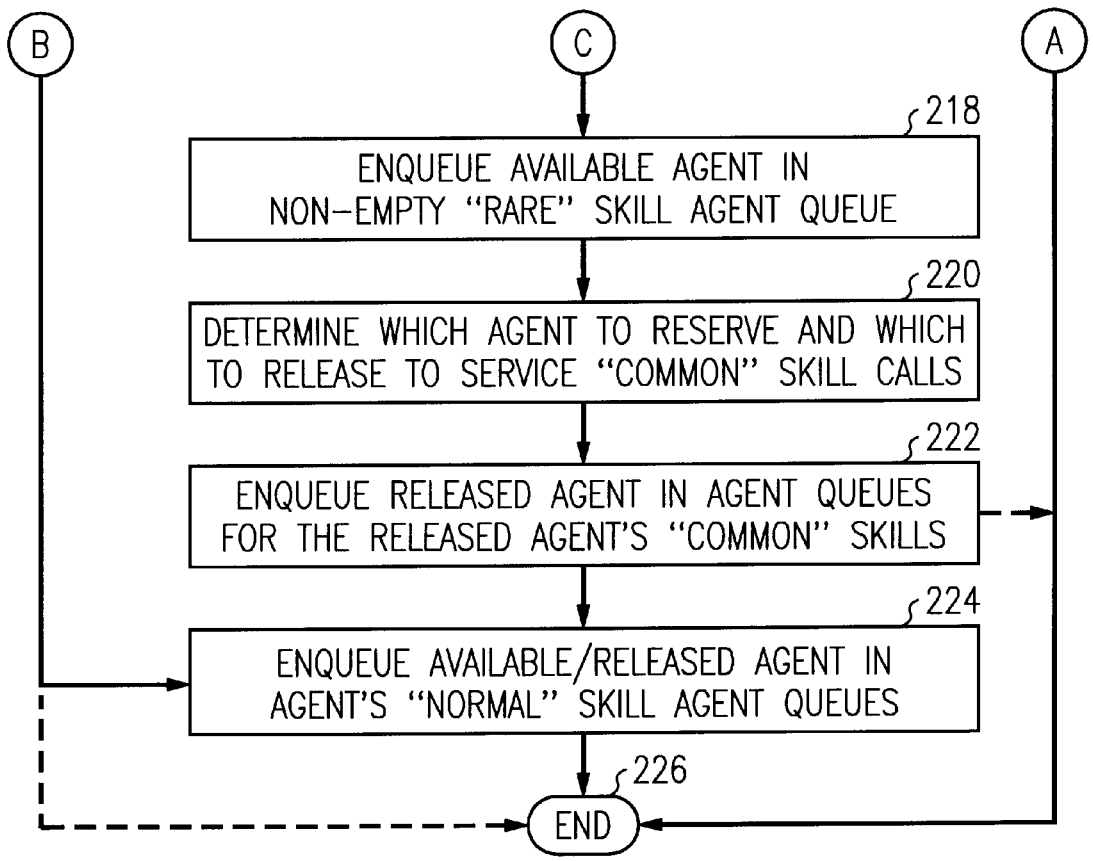

The functionality implemented by an illustrative embodiment of agent assignor 150 is shown in FIGS. 2 and 3. Agent assignor 150 is executed whenever one of the agents 102–104 becomes available to handle a call, at step 200. In response, agent assignor 150 determines what skills the available agent possesses, at step 202, by looking up this information in a stored agent profile of this agent. Agent assignor 150 then determines which of these skills have corresponding non-empty call queues among call queues 120, at step 204. Agent assignor 150 then checks stored skill profiles to determine if the skills of all of the non-empty call queues corresponding to the agent's skills are administratively specified as being "common", at step 206. If so, agent selector 150 uses one of the known prior-art schemes to assign the agent to agent queues 130, at step 212. For example, agent selector 150 may assign the agent to each one of queues 131–139 which corresponds to any of the agent's skills. Agent assignor 150 then ends its execution, at step 226.

If all of the agent's skills that correspond to non-empty call queues are found at step 206 to be designated as being "common", agent assignor 150 checks the skill profiles to determine whether all of the agent's skills whose corresponding call queues are not empty are meeting their service objectives, at step 208. For example, each skill has its own average speed of answer (ASA) target that has been administratively assigned to it, and agent assignor 150 compares the skill's ASA target with the skill's actual, measured, ASA. If any of the agent's skills are not meeting their service objectives, agent assignor 150 proceeds to step 212 to effect a conventional agent assignment. If all of the agent's skills are meeting their service objectives, agent assignor 150 checks stored skill profiles to determine if any of the agent's skills are administratively specified as being "rare", at step 210. If there are none, agent assignor 150 again proceeds to step 212; if some of the agent's skills are designated as "rare", agent assignor 150 checks those agent queues 131–139 that correspond to the agent's rare skills to determine which of those agent queues are empty, at step 214.

For each agent queue 131–139 corresponding to the agent's rare skill that is determined to be empty, agent assignor 150 enqueues the available agent in the empty agent queue, at step 216. For each agent queue 131–139 corresponding to the agent's rare skill that is determined to not be empty, agent assignor 150 enqueues the available agent in the non-empty agent queue, at step 218. In either case, this reserves the agent for calls needing the agent's non-common skills and makes the agent unavailable to service any waiting calls requiring the agent's common skills. Following step 218, however, agent assignor 150 determines which of the now-multiple agents enqueued in the rare skill agent queue to release for servicing calls requiring common skills, at step 220. For example, agent assignor 150 determines which of the enqueued agents is least occupied or most idle, and releases that agent. The release is effected by enqueuing the released agent in those agent queues 131–139 which correspond to the released agent's common skills, at step 222. If the system optionally includes a third category of skills administratively designated as "normal" skills, following steps 216 or 222, agent selector 150 enqueues the available agent (the one for whom the determination was made at step 214) in those agent queues which correspond to that agent's normal skills, at step 224. Following steps 216 or 222 if there is not a "normal" skills category, or following step 224 otherwise, agent assignment is completed, and so agent assignor ends its execution, at step 226.

It will be seen from the above description that agent assignor 150 implements the following agent-assignment logic:

IF the agent has a "rare" skill with NO calls in queue
AND
there are no other available agents for the "rare" skill
AND
the agent has a "common" skill with calls in queue
AND
the "common" skill is meeting its objectives for wait time
THEN
Do NOT service a call from the common queue and keep the agent reserved. In the event that another agent with the "rare" skill is available, release one of them to service calls from other queues.

Selection of agents from agent queues 130 and of calls from call queues 120 and assignments of calls to agents is then effected in any conventional manner.

Of course, various changes and modifications to the illustrative embodiment described above will be apparent to those skilled in the art. For example, use of the invention is not limited to use with ACD systems and agents, but may be used in any situations where communications are handled by a staff of handlers. Such changes and modifications can be made without departing from the spirit and the scope of the invention and without diminishing its attendant advantages. It is therefore intended that such changes and modifications be covered by the following claims.

What is claimed is:

1. A method of assigning a call handler to handle a call, comprising the steps of:

in response to a call handler having both a rare skill and a different common skill becoming available to handle a call, determining whether assigning the call handler to handle a call needing the common skill would deprive calls needing the rare skill of an only available call handler having the rare skill; and in response to determining that the assignment would deprive the calls needing the rare skill, assigning the call handler to handle a call needing the rare skill even when no call needing the rare skill is available for handling by the call handler, and forbearing from assigning the call handler to handle calls needing the common skill even when a call needing the common skill is available for handling by the call handler.

2. The method of claim 1 wherein:

the step of determining comprises the step of determining whether a service objective is being met for the calls needing the common skill; and the step of forbearing from assigning is further conditioned upon determining that the service objective is being met.

3. The method of claim 1 further comprising the steps of:

in response to determining that the assignment would not deprive the calls needing the rare skill, selecting one of the available call handlers having the rare skill, assigning the selected one call handler to handle a call needing the rare skill even when no call needing the rare skill is available for handling by the selected one call handler, forbearing from assigning the selected one call handler to handle calls needing the common skill even when a call needing the common skill is available for handling by the call handler, and assigning all non-selected call handlers having the rare skill to handle other calls.

4. The method of claim 1 wherein:

the step of determining comprises the steps of:

determining whether a call needing the rare skill is available for handling, determining whether another call handler having the rare skill is available for handling the call needing the rare skill, determining whether a call needing the common skill is available for handling, and determining whether a service objective is being met for the calls needing the common skill; and the step of assigning is conditioned upon determining that a call needing the rare skill is available, that another call handler having the rare skill is not available, that a call needing the common skill is available, and that the service objective is being met.

5. A method of assigning a call handler to handle a call in an environment that comprises a plurality of call queues each corresponding to a different skill and for identifying calls waiting to be handled by a call handler having the corresponding skill, comprising the steps of:

in response to a call handler, who has both one or more rare skills and different one or more common skills, becoming available to handle a call, determining whether all non-empty call queues that correspond to the agent's skills correspond to the agent's common skills, and determining whether service objectives are being met for calls needing skills corresponding to each of the non-empty call queues that correspond to the agent's common skills; and in response to a determination that all non-empty call queues that correspond to the agent's skills correspond to the agent's common skills and that service objectives are being met for calls needing skills corresponding to each of the non-empty call queues that correspond to the agent's common skills, if assigning the call handler to handle calls from the call queues corresponding to the call handler's common skills would deprive a rare skill of an only available handler, assigning the call handler to handle calls from the call queues corresponding to the call handler's rare skills, and forbearing from assigning the call handler to handle calls from the call queues corresponding to the agent's common skills.

6. The method of claim 5 further comprising the step of:

in response to said determination, further assigning the call handler to handle calls from a call queue corresponding to a normal skill of the agent, the normal skill being a skill other than the rare skills and the common skills.

7. The method of claim 5 wherein:

the steps of assigning and forbearing from assigning comprise the steps of:

determining whether another call handler is available to handle a call from each of the call queues corresponding to the call handler's rare skills;

in response to determining that another call handler is not available to handle a call from each of the call queues corresponding to the call handler's rare skills, assigning the call handler to handle calls from the call queues corresponding to the call handler's rare skills, and forbearing from assigning the call handler to handle calls from the call queues corresponding to the agent's common skills; and in response to determining that another call handler is available to handle a call from each of the call queues corresponding to the call handler's rare skills, selecting one of the call handler and the other call handler, assigning the selected call handler to handle calls from the call queues corresponding to the selected call handler's rare skills, forbearing trom assigning the selected call handler to handle calls from the call queues corresponding to the selected call handler's common skills, and assigning the non-selected call handler to handle calls from the call queues corresponding to any of the non-selected call handler's skills.

8. An apparatus that performs the method of claims 1 or 2 or 3 or 4 or 5 or 6 or 7.

9. A computer-readable medium containing software which, when executed in a computer, causes the computer to perform the steps of claims 1 or 2 or 3 or 4 or 5 or 6 or 7.

10. An apparatus for assigning a call handler to handle a call, comprising:

an effector, responsive to a call handler having both a rare skill and a different common skill becoming available to handle a call, of determining whether assigning the call handler to handle a call needing the common skill would deprive calls needing the rare skill of an only available call handler having the rare skill; and an effector, responsive to a determination that the assignment would deprive the calls needing the rare skill, of assigning the call handler to handle a call needing the rare skill even when no call needing the rare skill is available for handling by the call handler, and of forbearing from assigning the call handler to handle calls needing the common skill even when a call needing the common skill is available for handling by the call handler.

* * * * *